(12) United States Patent
Städele et al.

(10) Patent No.: US 11,155,055 B2
(45) Date of Patent: Oct. 26, 2021

(54) CORRUGATED CARDBOARD PLANT

(71) Applicant: BHS Corrugated Maschinen—und Anlagenbau GmbH, Weiherhammer (DE)

(72) Inventors: Norbert Städele, Parkstein (DE); Helmut Kraus, Wackersdorf (DE); Maximilian Mark, Tirschenreuth (DE)

(73) Assignee: BHS Corrugated Maschinen- und Anlagenbau GmbH, Weiherhammer (DE)

( * ) Notice: Subject to any disclaimer, the term of this patent is extended or adjusted under 35 U.S.C. 154(b) by 11 days.

(21) Appl. No.: 16/134,328

(22) Filed: Sep. 18, 2018

(65) Prior Publication Data
US 2019/0084267 A1 Mar. 21, 2019

(30) Foreign Application Priority Data
Sep. 21, 2017 (DE) ..................... 10 2017 216 717.3

(51) Int. Cl.
*B31F 1/28* (2006.01)
*B32B 37/12* (2006.01)
(Continued)

(52) U.S. Cl.
CPC ............ *B31F 1/2877* (2013.01); *B31F 1/285* (2013.01); *B31F 1/2813* (2013.01);
(Continued)

(58) Field of Classification Search
CPC .................................................. B31F 1/2881
See application file for complete search history.

(56) References Cited

U.S. PATENT DOCUMENTS 2,662,452 A * 12/1953 Sidebotham .......... B31F 1/2822
493/54
2,710,045 A 6/1955 Bruker
(Continued)

FOREIGN PATENT DOCUMENTS

DE 19 24 265 A1 12/1969
DE 33 44 941 A1 6/1984
(Continued)

OTHER PUBLICATIONS

Agnati Srl presentation at FEFCO Technical Seminar—Oct. 22-24, 2013.
(Continued)

*Primary Examiner* — Barbara J Musser
(74) *Attorney, Agent, or Firm* — McGlew and Tuttle, P.C.

(57) ABSTRACT

A corrugated cardboard plant comprises at least one device for producing a respective corrugated cardboard web laminated on one side; a lamination web dispensing device; a lamination web printing device disposed downstream of the lamination web dispensing device; and a device, disposed downstream of the lamination web printing assembly, for producing a corrugated cardboard web laminated on two sides from the at least one corrugated cardboard web laminated on one side and from a lamination web. The at least one device for producing a respective corrugated cardboard web laminated on one side is configured and/or disposed in such a manner that the at least one corrugated cardboard web laminated on one side, at least in a manner adjacent upstream of the device for producing a corrugated cardboard web laminated on both sides, has a respective upwardly directed corrugation. The lamination web in the device for producing a corrugated cardboard web laminated on two sides is guided in such a manner that said lamination web (Continued)

therein runs above the at least one corrugated cardboard web laminated on one side.

17 Claims, 8 Drawing Sheets

(51) Int. Cl.
    *B31F 5/04*     (2006.01)
    *B32B 37/00*     (2006.01)

(52) U.S. Cl.
    CPC .......... *B31F 1/2818* (2013.01); *B31F 1/2822* (2013.01); *B31F 1/2836* (2013.01); *B31F 5/04* (2013.01); *B31F 1/2854* (2013.01); *B32B 37/0046* (2013.01); *B32B 37/1284* (2013.01); *B32B 2309/08* (2013.01)

(56) References Cited

U.S. PATENT DOCUMENTS

| | | |
|---|---|---|
| 2,990,173 A | 6/1961 | Melville |
| 4,169,007 A | 9/1979 | Pray |
| 4,587,898 A * | 5/1986 | Welschlau ............... B41F 13/56 101/224 |
| 4,603,654 A | 8/1986 | Mori et al. |
| 5,389,183 A * | 2/1995 | Seki ...................... B31F 1/2831 156/210 |
| 2004/0182504 A1* | 9/2004 | Stadele ................. B31F 1/2822 156/210 |
| 2005/0194088 A1* | 9/2005 | Kohler ................. B31F 1/2818 156/210 |
| 2006/0225830 A1 | 10/2006 | Kohler |
| 2010/0188468 A1 | 7/2010 | Herpel et al. |
| 2011/0149003 A1 | 6/2011 | Kondo |
| 2011/0247746 A1 | 10/2011 | Schumacher et al. |
| 2013/0029825 A1 | 1/2013 | Rich |
| 2013/0068369 A1 | 3/2013 | Mann et al. |

FOREIGN PATENT DOCUMENTS

| | | |
|---|---|---|
| DE | 10 2011 076899 A1 | 12/2012 |
| EP | 2 202 081 A1 | 6/2010 |
| EP | 2 551 117 A2 | 1/2013 |
| EP | 2 792 478 A1 | 10/2014 |
| GB | 1 204 984 A | 9/1970 |
| GB | 1204986 A | 9/1970 |
| GB | 2 087 916 A | 6/1982 |
| GB | 2131742 B | 5/1986 |
| JP | 56/70074 A | 6/1981 |
| JP | S57/076027 U | 5/1982 |
| JP | 2003 063707 A | 3/2003 |
| JP | 2010/137386 A | 6/2010 |
| JP | 2014/522350 A | 9/2014 |
| JP | 2016/504973 A | 2/2016 |
| JP | 2017/061147 A | 3/2017 |
| JP | 2019/055590 A | 4/2019 |

OTHER PUBLICATIONS

Pressemitteilung: FEFCO.

Agnati Srl presentation at VDW Technical General Meeting—Nov. 17-18, 2014.

\* cited by examiner

CORRUGATED CARDBOARD PLANT

CROSS-REFERENCE TO RELATED APPLICATIONS

This application claims priority of German Patent Application Serial No. DE 10 2017 216 717.3, filed on Sep. 21, 2017, pursuant to 35 U.S.C. 119(a)-(d), the content of which is incorporated herein by reference in its entirety as if fully set forth herein.

FIELD OF THE INVENTION

The invention relates to a corrugated cardboard plant and to a method for producing corrugated cardboard.

BACKGROUND OF THE INVENTION

Corrugated cardboard plants having printing assemblies are generally known from the prior art by way of the obvious prior use thereof. The quality of the imprint by the printing assemblies is unsatisfactory in many instances.

SUMMARY OF THE INVENTION

The invention is based on the object of achieving a corrugated cardboard plant having a printing assembly which requires a comparatively small space. Furthermore, the printing quality and the corrugated cardboard quality, respectively, are to be particularly high. A respective production method is likewise to be provided.

This object is achieved according to the invention by a corrugated cardboard plant for producing corrugated cardboard, comprising at least one device, having a respective corrugating installation, for producing a respective corrugated cardboard web laminated on one side from a respective cover web and a respective material web; a lamination web dispensing device for dispensing a lamination web; a lamination web printing assembly, disposed downstream of the lamination web dispensing device, having at least one lamination web printing device for imprinting the lamination web; and a device, disposed downstream of the lamination web printing assembly for producing a corrugated cardboard web laminated on two sides from the at least one corrugated cardboard web laminated on one side and the lamination web; wherein the at least one device for producing a respective corrugated cardboard web laminated on one side is configured and/or disposed in such a manner that the at least one corrugated cardboard web laminated on one side, at least in a manner adjacent upstream of the device for producing a corrugated cardboard web laminated on both sides, has a respective upwardly directed corrugation, wherein the lamination web into the device for producing a corrugated cardboard web laminated on two sides is guided in such a manner that said lamination web therein runs above the at least one corrugated cardboard web laminated on one side.

Furthermore, this object is achieved according to the invention by a method for producing corrugated cardboard, comprising the step of applying glue by means of a gluing unit to free tips of at least one corrugated cardboard web laminated on one side for connecting the latter in a glued manner to a further web for forming a corrugated cardboard web laminated on two sides, wherein the glue permits processing temperatures of below 70° C., said temperatures favourably being present on the at least one corrugated cardboard web laminated on one side and/or on the lamination web The core concept of the corrugated cardboard plant according to the invention lies in that the lamination web by means of a lamination web printing assembly is imprinted, in particular temporally and/or locationally prior to the formation of a corrugated cardboard web laminated on two sides, in the device for producing a corrugated cardboard web laminated on two sides, thus prior to being connected to a corrugated cardboard web laminated on one side. The lamination web printing assembly in operation imprints the conveyed lamination web that is in particular not yet linked on an external printed side. The lamination web is, or remains, respectively, a smooth non-corrugated web. The corrugated cardboard web laminated on two sides has at least three plies, preferably three plies, five plies, or seven plies.

The at least one corrugated cardboard web laminated on one side, in a manner adjacent to the device for producing a corrugated cardboard web laminated on two sides, and in particular also therein, has a respective upwardly directed corrugation. The corrugated web therein is thus located above the associated/assigned cover web of the respective corrugated cardboard web laminated on one side.

The device for producing a corrugated cardboard web laminated on two sides laminates the lamination web from above onto the adjacent corrugated cardboard web laminated on one side.

The lamination web printing assembly is advantageously configured as a digital printing assembly, in particular an ink jet printing assembly. Said lamination web printing assembly is preferably retro-fittable. Alternatively, other known printing assemblies can be used. The lamination web printing assembly is in particular capable of imprinting at least one alphabetic letter, a numeral, another sign, a graph and/or a photograph on the lamination web. A paint or printing ink, respectively, is favourably used to this end. It is advantageous for the lamination web printing assembly to be capable of multi-colour printing.

The lamination web printing assembly favourably has a plurality of printing heads which are disposed in a cascading manner in the transverse direction in the lamination web. The lamination web printing assembly preferably has a plurality of rows of printing heads that are disposed behind one another. It is advantageous for the lamination web to be imprinted, when imprinting in the lamination web printing assembly, to be guided over a printing cylinder or a central cylinder, respectively. The printing cylinder preferably extends horizontally and perpendicularly to a conveying direction of the lamination web.

At least one cover web dispensing device favourably dispenses the respective cover web. It is advantageous for the at least one cover web dispensing device to be configured as a splicing device for providing a respective continuous cover web.

At least one material web dispensing device favourably dispenses the respective material web. It is advantageous for the at least one material web dispensing device to be configured as a splicing device for providing a respective continuous material web.

The lamination web dispensing device is preferably configured as a splicing device for providing a continuous lamination web.

The device for producing a corrugated cardboard web laminated on two sides favourably connects the at least one corrugated cardboard web laminated on one side to the in particular imprinted lamination web. The device for producing a corrugated cardboard web laminated on two sides preferably has at least one compression gap, or at least one compression section, respectively, through which the at least one corrugated cardboard web laminated on one side and the lamination web are guided and mutually compressed. Glue for connecting the webs in a glued manner is preferably located between said webs. The at least one compression gap, or the at least one compression section, respectively, is favourably formed or delimited, respectively, by at least two, in particular drivable, compression rollers or compression belts that are disposed in pairs. The compression belts are preferably continuous.

Each corrugating installation is favourably formed by two rotatably mounted grooving rollers. The grooving rollers for guiding through and grooving the respective material web while forming a corrugated web configure a roller gap or a grooving gap, respectively.

The terms "disposed upstream", "disposed downstream", "upstream", "downstream", "behind one another" or the like used here refer in particular to the conveying direction of the respective conveyed web.

The processing temperatures of the glue of below 70° C. as claimed by the method according to the invention for producing corrugated cardboard lead to particularly little energy being required in order for the corrugated cardboard to be produced. Furthermore, the webs to be glued, or to be interconnected, respectively, are treated in a gentle manner. The glue has a comparatively low bonding temperature or curing temperature, respectively.

The pressure installation of the at least one device for producing a respective corrugated cardboard web laminated on one side for pressing the respective cover web against the respective glued corrugated material web, wherein a contact pressure entry of the respective pressure installation faces the device for producing a corrugated cardboard web laminated on two sides, favourably presses the respective cover web against the corrugated web which preferably bears on the adjacent grooving roller.

It is advantageous for the pressure installation to be embodied as a contact pressure belt module. The corrugated cardboard web laminated on one side preferably exits the respective pressure installation by way of a respective contact pressure exit which faces away from the device for producing a corrugated cardboard web laminated on two sides. The contact pressure entry and the contact pressure exit of the respective pressure installation are favourably disposed so as to be mutually spaced apart.

The at least one deflection assembly, disposed downstream of the at least one corrugating installation, for deflecting the at least one corrugated cardboard web laminated on one side in a direction towards the device for producing a corrugated cardboard web laminated on two sides favourably has at least one deflection roller or deflection bar, respectively. The at least one deflection roller or deflection bar, respectively, preferably extends perpendicularly to the associated corrugated cardboard web laminated on one side, or to the conveying direction of the latter, respectively, and horizontally. The at least one deflection assembly is a component part of the at least one device for producing a corrugated cardboard web laminated on one side and/or of a gantry, for example. Alternatively, said at least one deflection assembly is embodied separately and disposed between the at least one device for producing a corrugated cardboard web laminated on one side and the gantry, for example.

The at least one glue application installation of the at least one device for producing a respective corrugated cardboard web laminated on one side preferably has in each case one glue metering roller, one glue container, and one glue application roller for applying glue to the respective corrugated material web, wherein the at least one glue application installation is preferably disposed on a side of the respective corrugating installation that faces the device for producing a corrugated cardboard web laminated on two sides. The respective glue application roller, conjointly with a grooving roller, preferably configures a glue gap for guiding through and gluing the respective corrugated web. The glue located in the glue container is favourably applied to tips of the corrugation of the corrugated web by way of the glue application roller. The glue metering roller preferably bears on the adjacent glue application roller and serves for configuring a uniform glue layer on the glue application roller.

The gluing unit disposed upstream of the device for producing a corrugated cardboard web laminated on two sides and is configured in such a manner that said gluing unit applies glue from above to the at least one corrugated cardboard web laminated on one side favourably applies glue from above to tips of the corrugation of the at least one corrugated cardboard web laminated on one side. Said application is favourably facilitated by gravity. The gluing unit can also be the subject matter of an independent inventive subject matter.

The gluing unit, which uses glue that permits processing temperatures of below 70° C., has a particularly low requirement in terms of energy. Corrugated cardboard can thus be produced in an extremely economical manner. Furthermore, preferably particularly little moisture is thus introduced into the at least one corrugated cardboard web laminated on one side, this resulting in a planar upper side and permitting an extremely short device for producing a corrugated cardboard web laminated on two sides.

The glue has a comparatively low bonding temperature or curing temperature, respectively.

Bonding or curing, respectively, of the glue is performed in particular when the latter is applied to the at least one corrugated cardboard web laminated on one side, or immediately thereafter, respectively, the glue receptacle region of said corrugated cardboard web preferably having a temperature which is sufficient for the glue to bond, cure, or dry, respectively. Regions of the glue or of glue lines, respectively, herein favourably experience temperatures of below 70° C. both when the glue is applied as well as thereafter. The processing temperatures of the glue are favourably present on the at least one corrugated cardboard web laminated on one side.

The at least one gluing roller of the gluing unit for gluing the respective corrugated cardboard web laminated on one side, wherein the at least one gluing roller upwardly delimits at least one pressure gap for guiding through the respective corrugated cardboard web laminated on one side, is favourably disposed above the respective corrugated cardboard web laminated on one side that is to be glued. It is expedient for the gluing unit to furthermore have at least one glue bath into which the at least one gluing roller is submerged, or which supplies glue to said at least one gluing roller, respectively. The gluing unit favourably has at least one metering roller which for configuring a uniform glue film on the gluing roller bears circumferentially on the at least one gluing roller. Filling of the glue bath is preferably performed from above.

It is advantageous for the lamination web printing assembly, which is disposed upstream of and adjacent to the gluing unit in such a manner that the lamination web printing assembly heats the lamination web in such a manner that the glue applied by the gluing unit bonds, to be disposed so as to be adjacent to the gluing unit. A separate pre-heating assembly for pre-heating the at least one corrugated cardboard web laminated on one side and/or the lamination web, in particular directly upstream of the device for producing a corrugated cardboard web laminated on two sides, or upstream of the gluing unit, respectively, can thus be dispensed with. This can in particular be traced back to a particularly short section being present between the imprinting by the at least one lamination web printing device and the device for producing a corrugated cardboard web laminated on two sides. A spacing between the lamination web printing assembly, or the at least one lamination web printing device of the lamination web printing assembly, respectively, and the gluing unit is favourably smaller than 5 m. The lamination web printing assembly has at least one dedicated heating element for heating the lamination web, for example. Respective heating of the lamination web is performed, for example, by at least one imprint drying device of the lamination web printing assembly that is assigned to the lamination web.

The corrugated cardboard plant configured such that the lamination web printing assembly heats the lamination web in such a manner that said lamination web in the device for producing a corrugated cardboard web laminated on two sides is connectable in a glued manner to the adjacent corrugated cardboard web laminated on one side again has a particularly low requirement in terms of energy. Corrugated cardboard can thus be produced in an extremely economical manner. The lamination web printing assembly, when imprinting the lamination web or when pressure drying, respectively, favourably heats said lamination web at least in regions to a maximum of 120° C., more preferably to 50° C. to 70° C.

The corrugated cardboard plant comprising a guide assembly for guiding the at least one corrugated cardboard web laminated on one side below the lamination web printing assembly at least at the lamination web printing assembly has a particularly low height. It is advantageous for the guide assembly to run so as to be adjacent to a floor that supports the corrugated cardboard plant. The guide assembly is disposed, for example, above the floor or in the floor, this leading to the at least one corrugated cardboard web laminated on one side being guided above or below ground level, respectively. The at least one corrugated cardboard web laminated on one side preferably passes the lamination web printing assembly in the guide assembly. It is expedient for the guide assembly to comprise at least one guide roller and/or one guidebelt for guiding the at least one corrugated cardboard web laminated on one side.

The at least one lamination web printing device having a central cylinder and a pressure bar which is disposed so as to be adjacent to the central cylinder while forming a printing gap for guiding through the lamination web enables an extremely high printing quality. Moreover, extremely economical imprinting is thus possible.

The corrugated cardboard plant comprising an alignment assembly disposed upstream of the device for producing a corrugated cardboard web laminated on two sides for mutually aligning the at least one laminated corrugated cardboard web and the lamination web again results in a particularly high corrugated cardboard quality. In particular, particularly good mutual adapting or matching, respectively, of the at least one corrugated cardboard web laminated on one side and the lamination web is thus possible. In particular, the at least one corrugated cardboard web laminated on one side and/or the lamination web are/is capable of being laterally deflected. To this end, the alignment assembly preferably has at least one repositionable alignment roll or alignment roller, respectively, the at least one web to be aligned being guided around said alignment roll or alignment roller, respectively. It is expedient for the alignment assembly to comprise at least one rotatable or pivotable, respectively, swivel frame, in particular having at least two web guide rollers and/or at least one cambered roll/pivoting roller for aligning the lamination web and/or the at least one corrugated cardboard web laminated on one side. The at least one cambered roll/pivoting roller herein preferably pivots in a horizontal plane and favourably about the in particular axial centre of said cambered roll/pivoting roller. A focal point lies upstream in a drying device, for example.

The design embodiment configured such that the lamination web dispensing device is disposed so as to be adjacent to the lamination web printing assembly enables an extremely short transportation section of the lamination web between the lamination web dispensing device and the lamination web printing assembly.

The lamination web dispensing device disposed in an upstream end region of the corrugated cardboard plant favourably forms the beginning of the corrugated cardboard plant. It is advantageous for imprinting to be performed at the level of the gantry.

The device for producing a corrugated cardboard web laminated on two sides preferably has a length which is smaller than 15 m.

The design embodiments discussed above can also relate to preferred refinements of the method according to the invention for producing corrugated cardboard.

Two preferred embodiments of the invention will be described in an exemplary manner hereunder with reference to the appended drawing.

DESCRIPTION OF THE PREFERRED EMBODIMENTS

Figure 1:
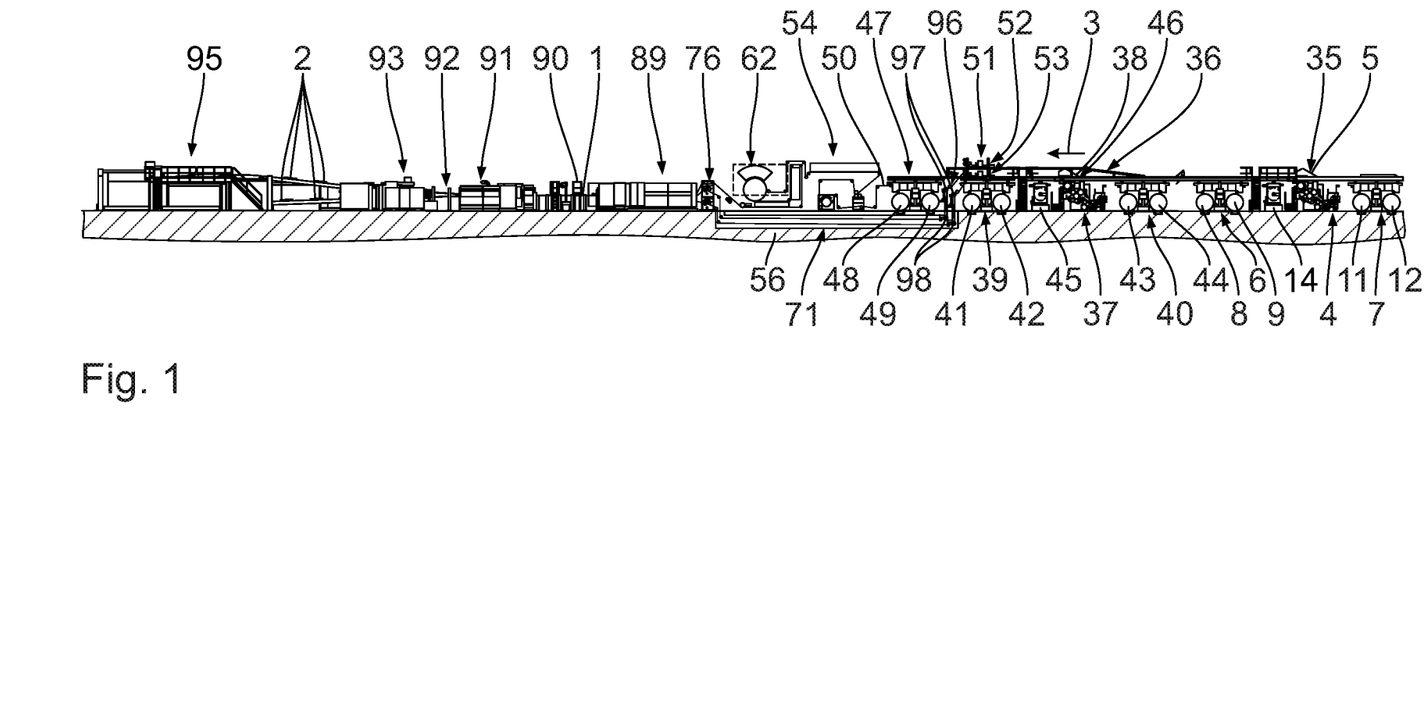
FIG. 1 shows a schematic lateral view of a corrugated cardboard plant according to the invention.
Figure 2:
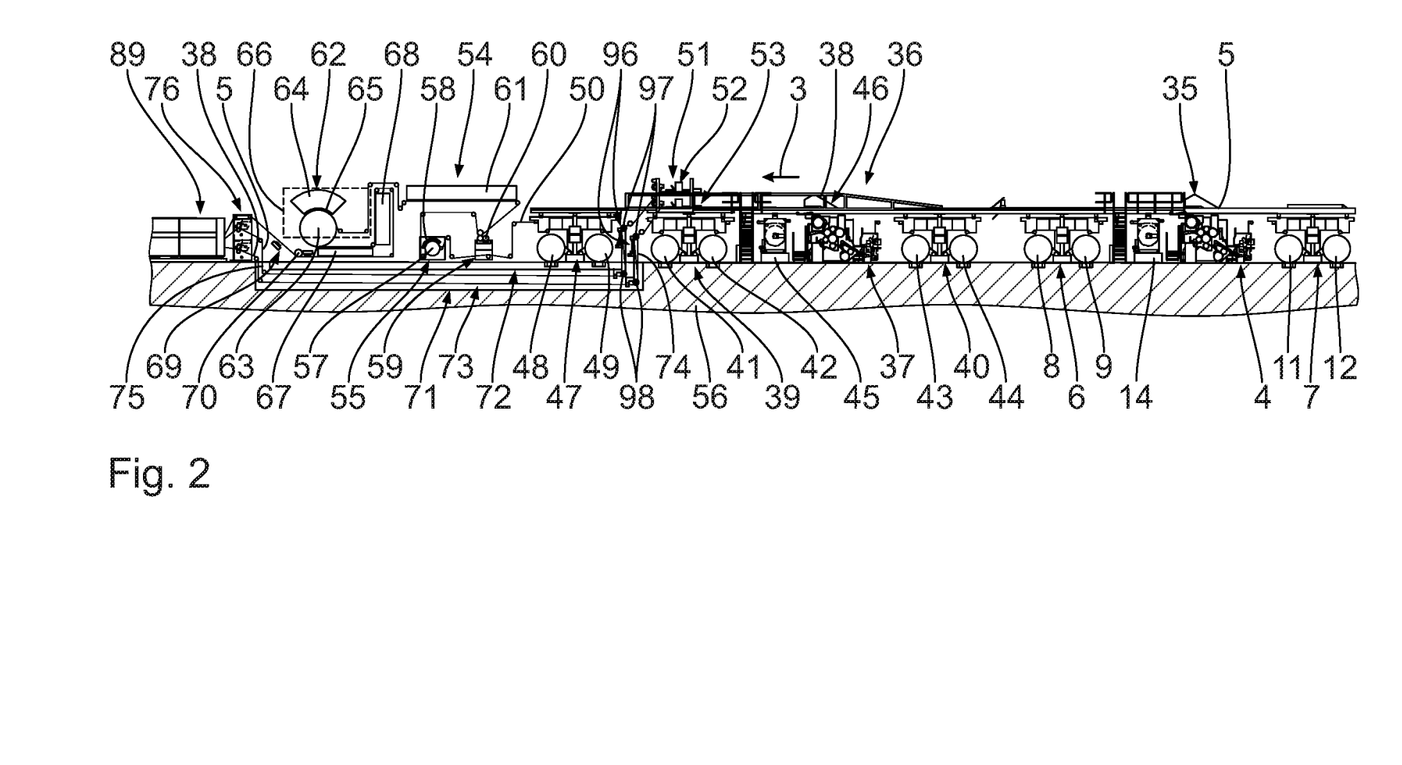
FIG. 2 shows an enlarged fragment from FIG. 1, which visualizes the device for producing a corrugated cardboard web laminated on two sides and that part of the corrugated cardboard plant according to FIG. 1 that is disposed upstream of said device.

A corrugated cardboard plant shown in its entirety in FIG. 1 is capable of producing a continuous five-ply corrugated cardboard web 1, or five-ply corrugated cardboard sheets 2, respectively. The corrugated cardboard plant is embodied in a longitudinal manner. Said corrugated cardboard plant extends substantially from a beginning (on the right in FIG. 1) in a straight manner in a longitudinal direction or conveying direction 3, respectively.

The corrugated cardboard plant comprises a first device 4 for producing a first corrugated cardboard web 5 laminated on one side.

A first cover web splicing device 6 and a first material web splicing device 7 are disposed upstream of the first device 4 for producing a corrugated cardboard web 5 laminated on one side.

The first cover web splicing device 6 comprises a first unwinding unit for unwinding a finite first cover web from a first cover web roll 8, and a second unwinding unit for unwinding a finite cover web from a second cover web roll 9. The finite first cover web and the finite second cover web are connected to one another in the first cover web splicing device 6 in order for a continuous first cover web 10 to be provided.

The first material web splicing device 7 which forms a beginning of the corrugated cardboard plant is configured in a manner corresponding to that of the first cover web splicing device 6. Said first cover web splicing device 6 comprises a third unwinding unit for unwinding a finite first material web from a first material web roll 11, and a fourth unwinding unit for unwinding a finite second material web from a second material web roll 12. The finite first material web and the finite second material web are connected to one another in the first material web splicing device 7 in order for a continuous first material web 13 to be provided.

The continuous first cover web 10 is fed to the first device 4 for producing a first corrugated cardboard web 5 laminated on one side by way of a first heating assembly 14, while the continuous first material web 13 is fed to the first device 4 for producing a first corrugated cardboard web 5 laminated on one side by way of a first deflection assembly 14a.

Figure 3:
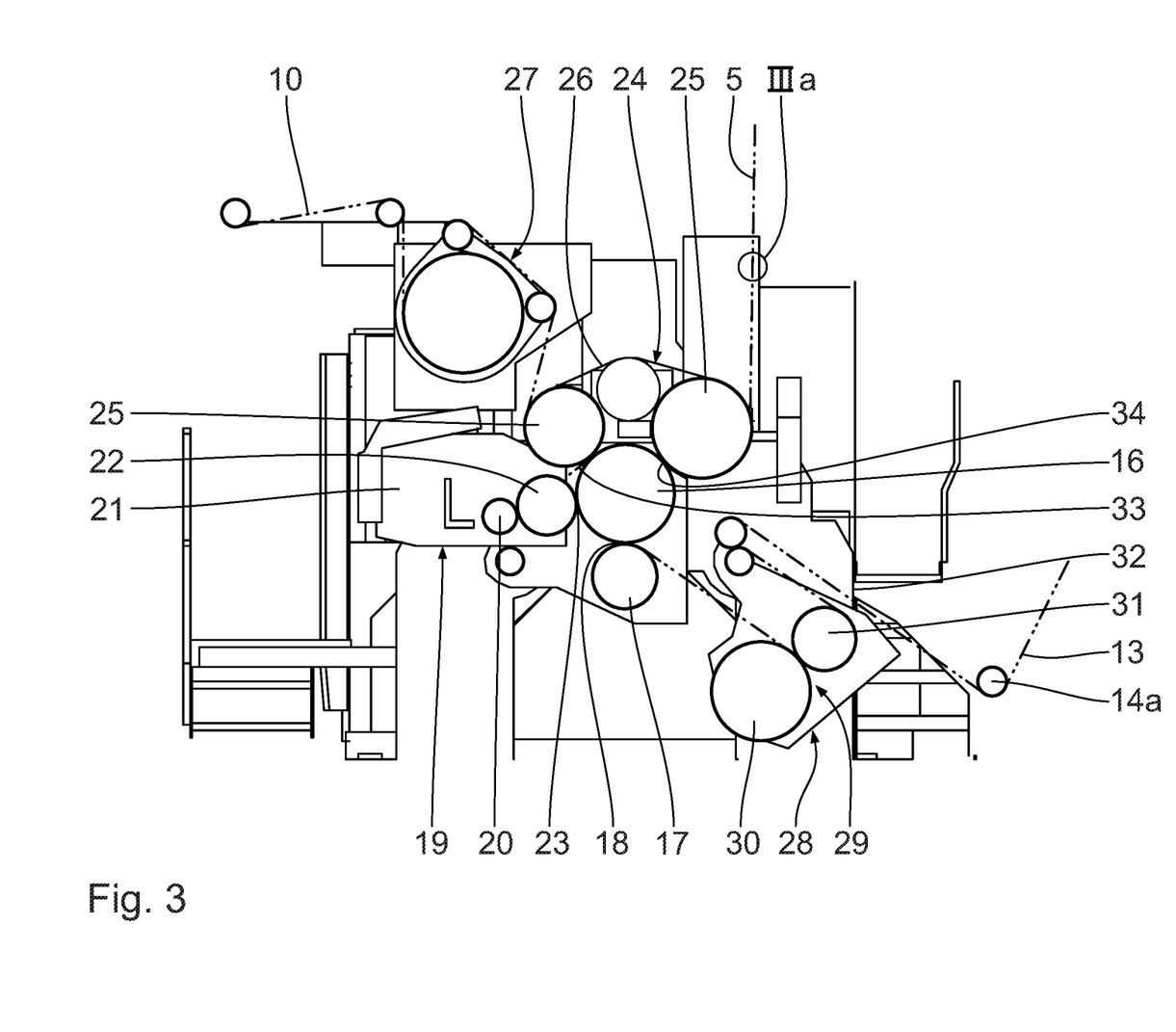
FIG. 3 shows a lateral view of a device, for producing a corrugated cardboard web laminated on one sides, of the corrugated cardboard plant shown in FIGS. 1, 2.
Figure 3A:
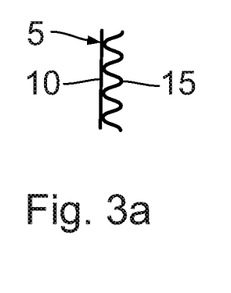
FIG. 3a shows an enlarged fragment which shows the orientation of the corrugated cardboard web laminated on one side after the latter has been formed after the pressure installation.

The first device 4 for producing a first corrugated cardboard web 5 laminated on one side, for generating a continuous first corrugated web 15 having a corrugation from the continuous first material web 13, comprises a rotatably mounted first grooving roller 16 and a rotatably mounted second grooving roller 17. The grooving rollers 16, 17 configure a first roller gap 18 for guiding through and grooving the continuous first material web 13. Said grooving rollers 16, 17 conjointly form a first grooving installation.

In order for the continuous first corrugated web 15 to be connected to the continuous first cover web 10 so as to form the first corrugated cardboard web 5 laminated on one side, the first device 4 for producing a first corrugated cardboard web 5 laminated on one side has a first glue application installation 19 which comprises a first glue metering roller 20, a first glue container 21, and a first glue application roller 22. The first glue application installation 19 is disposed on a side of the first corrugating installation that faces away from the beginning of the corrugated cardboard plant. The first glue application roller 22, conjointly with the first grooving roller 16, configures a first glue gap 23 for guiding through and gluing the continuous first corrugated web 15. The glue located in the first glue container 21 is applied to tips of the corrugation of the continuous first corrugated web 15 by way of the first glue application roller 22. The first glue metering roller 20 bears on the first glue application roller 22 and serves for configuring a uniform glue layer on the first glue application roller 22.

The continuous first cover web 10 in the first device 4 for producing a first corrugated cardboard web 5 laminated on one side is subsequently joined to the continuous first corrugated web 15 provided with glue from the first glue container 21.

In order for the continuous first cover web 10 to be pressed against the continuous first corrugated web 15 provided with glue, the latter web in turn in regions bearing on the first grooving roller 16, the first device 4 for producing a first corrugated cardboard web 5 laminated on one side has a first contact pressure module 24. The first contact pressure module 24 is favourably embodied as a contact pressure belt module. Said first contact pressure module 24 is disposed above the first grooving roller 16. The first contact pressure module 24 has two first deflection rollers 25 and a continuous first contact pressure belt 26 which is guided around the two first deflection rollers 25.

The first grooving roller 16 in regions engages from below in a space that is present between the two first deflection rollers 25, on account of which the first contact pressure belt 26 is deflected by the first grooving roller 16. The first contact pressure belt 26 presses against the continuous first cover web 10 which in turn is pressed against the continuous first corrugated web 15 that is provided with glue and bears on the first grooving roller 16.

The first device 4 for producing a first corrugated cardboard web 5 laminated on one side moreover comprises a first web tension influencing installation 27 which is disposed upstream of the first contact pressure module 24 and is assigned to the continuous first cover web 10. The tension of the continuous first cover web 10 can thus be influenced by way of the first web tension influencing installation 27.

The first device 4 for producing a first corrugated cardboard web 5 laminated on one side moreover comprises a first corrugating installation changeover installation 28 which stores a previously inactive second corrugating installation 29 for a changeover. The first corrugating installation changeover installation 29 in terms of the continuous first material web 13 is disposed upstream of the first corrugating installation. Said first corrugating installation changeover installation 29 comprises a third grooving roller 30 and a fourth grooving roller 31 for grooving the continuous first material web 13. The second corrugating installation 29 has another grooving pattern as compared to the first corrugating installation. The first corrugating installation changeover installation 28 is pivotable between an inactive parking position (cf. FIG. 3) and an active grooving position. The continuous first material web 13 is favourably guided only through the currently active corrugating installation, so as to bypass the inactive corrugating installation. Alternatively, said continuous first material web 13 is guided through both the inactive corrugating installation as well as through the active corrugating installation.

The continuous first material web 13 is guided into the first device 4 for producing a first corrugated cardboard web 5 laminated on one side by way of a first material web entry 32. The first material web entry 32 faces the first material web splicing device 7 and thus the beginning of the corrugated cardboard plant. The first glue application installation 19 is disposed on a side of the first corrugating installation that faces away from the first material web entry 32.

The continuous first cover web 10 and the continuous lamination web 50 enter the first contact pressure module 24, or the pressure gap thereof, respectively, on a side that faces away from the first material web entry 32, or faces away from the beginning of the corrugated cardboard plant, respectively, and exit said first contact pressure module 24 on a side that faces the first material web entry 32, or the beginning of the corrugated cardboard plant, respectively. To this end, the first contact pressure module 24 has a first contact pressure entry 33 and a first contact pressure exit 34 that is disposed so as to be spaced apart from said first contact pressure entry 33. The first contact pressure exit 34 faces away from the first glue application installation 19. The first contact pressure exit 33 is disposed so as to be adjacent to the first glue application installation 19.

In order for the first corrugated cardboard web 5 laminated on one side to be further conveyed, said first corrugated cardboard web 5 laminated on one side is fed to a gantry 36 of the corrugated cardboard plant by way of a first elevated transportation installation 35. Between the first contact pressure module 24 and the gantry 36, the continuous first corrugated web 15 of the first corrugated cardboard web 5 laminated on one side faces the beginning of the corrugated cardboard plant.

The continuous first corrugated web 15 of the first corrugated cardboard web 5 laminated on one side, on the gantry 36, faces upwards. Conversely, the continuous first cover web 10 of the first corrugated cardboard web 5 laminated on one side faces downwards. The first corrugated cardboard web 5 laminated on one side has been deflected in a corresponding manner on the gantry 36, or on the first elevated transportation installation 35, respectively. The gantry 36 can also serve for the intermediate storage and buffer storage of the first corrugated cardboard web 5 laminated on one side.

The corrugated cardboard plant moreover comprises a second device 37 for producing a second corrugated cardboard web 38 laminated on one side.

A second cover web splicing device 39 and a second material web splicing device 40 are disposed upstream of the second device 37 for producing a corrugated cardboard web 38 laminated on one side.

The second cover web splicing device 39 is configured in a manner corresponding to that of the first cover web splicing device 6. Said second cover web splicing device 39 comprises a fifth unwinding unit for unwinding a finite third cover web from a third cover web roll 41, and a sixth unwinding unit for unwinding a finite fourth cover web from a fourth cover web roll 42. The finite third cover web and fourth cover web are connected to one another in the second cover web splicing device 39 in order for a continuous second cover web to be provided.

The second material web splicing device 40 is configured like the first material web splicing device 7. Said second material web splicing device 40 comprises a seventh unwinding unit for unwinding a finite third material web from a third material web roll 43, and an eighth unwinding unit for unwinding a finite fourth material web from a fourth material web roll 44. The finite third material web and finite fourth material web are connected to one another in the second material web splicing device 40 in order for a continuous second material web to be provided.

The continuous second cover web is fed to the second device 37 for producing a second corrugated cardboard web 38 laminated on one side by way of a second heating assembly 45, while the continuous second material web is fed to the second device 37 for producing a second corrugated cardboard web 38 laminated on one side by way of a second deflection assembly.

The second device 37 for producing a second corrugated cardboard web 38 laminated on one side is configured in a manner corresponding to that of the first device 4 for producing a first corrugated cardboard web 5 laminated on one side. Said second device 37 for producing a second corrugated cardboard web 38 laminated on one side is also oriented in an analogous manner. Reference is made to the description above. A second contact pressure exit of the second device 37 for producing a second corrugated cardboard web 38 laminated on one side thus faces the direction towards the first contact pressure entry 33 of the first device 4 for producing a first corrugated cardboard web 5 laminated on one side and thus faces the beginning of the corrugated cardboard plant.

In order for the second corrugated cardboard web 38 laminated on one side to be further conveyed, said second corrugated cardboard web 38 laminated on one side is fed to the gantry 36 by way of a second elevated transportation installation 46. On the gantry 36, a continuous second corrugated web of the second corrugated cardboard web 38 laminated on one side faces upwards. Conversely, a continuous second corrugated web of the second corrugated cardboard web laminated on one side faces downwards. The second corrugated cardboard web 38 laminated on one side has been deflected in a corresponding manner on the gantry 36, or on the second elevated transportation installation 46, respectively. On the gantry 36, said second corrugated cardboard web 38 laminated on one side is guided below the first corrugated cardboard web 5 laminated on one side. The gantry 36 can also serve for the intermediate storage and buffer storage of the second corrugated cardboard web 38 laminated on one side.

The corrugated cardboard plant furthermore has a lamination web splicing device 47 which is configured like other splicing devices 6, 7, 39, 40. The lamination web splicing device 47 is disposed so as to be adjacent to the second cover web splicing device 39 and comprises a ninth unwinding unit for unwinding a finite first lamination web from a first lamination web roll 48, and a tenth unwinding unit for unwinding a finite second lamination web from a second lamination web roll 49. The finite first lamination web and the finite second lamination web are connected to one another in the lamination web splicing device 47 in order for a continuous lamination web 50 to be provided. The continuous lamination web 50 is single-ply.

A brake assembly 51 which comprises a first brake device 52 assigned to the first corrugated cardboard web 5 laminated on one side, and a second brake device 53 assigned to the second corrugated cardboard web 38 laminated on one side, is disposed in a downstream end region on the gantry 36. The first brake device 52 is capable of acting in a braking manner on the first corrugated cardboard web 5 laminated on one side. The second brake device 53 is capable of acting in a braking manner on the second corrugated cardboard web 38 laminated on one side. Adapting the corrugated cardboard webs 5, 38 laminated on one side to the continuous lamination web 50 is thus possible. The brake assembly 51 is disposed above the lamination web splicing device 47.

A lamination web printing assembly 54 in terms of the continuous lamination web 50 is disposed downstream to the lamination web splicing device 47.

The lamination web printing assembly 54 comprises a corona pre-treatment device 55 which stands on a floor or a hard surface 56, respectively. The corona pre-treatment device 55 comprises a corona support roller 57 and at least one electrode 58 that is disposed so as to be adjacent to the latter. The corona support roller 57 extends horizontally and perpendicularly to the conveying direction 3 of the continuous lamination web 50. The continuous lamination web 50 is guided around the corona support roller 57. The continuous lamination web 50 herein runs through a gap which is formed or delimited, respectively, by the corona support roller 57 and by the at least one electrode 58. The continuous lamination web 50, on account of the corona pre-treatment device 55, is exposed to an electric corona discharge, this leading to an oxidation of the surface of said continuous lamination web 50, in particular on the printed side. This results in a comparatively high increase in pixels in a later application of paint or in later imprinting, respectively. The adhesion of a printing ink on the continuous lamination web 50 can thus be improved.

The lamination web printing assembly 54 moreover has a pre-coating application device 59 which in terms of the continuous lamination web 50 is disposed downstream of the corona pre-treatment device 55 and stands on the floor 56. The pre-coating application device 59 is assigned to the continuous lamination web 50 and is capable of applying a planar pre-coating to an external side, or printed side, respectively, of the continuous lamination web 50. To this end, the pre-coating application device 59 favourably utilizes at least one pre-coating roller 60 which extends horizontally and perpendicularly to the conveying direction 3 of the continuous lamination web 50. The at least one pre-coating roller 60 is preferably submerged in a pre-treatment means that is capable of being applied, or is supplied with such a pre-treatment means, respectively.

The lamination web printing assembly 54 furthermore has a pre-coating drying device 61 which in terms of the continuous lamination web 50 is disposed downstream of the pre-coating application device 59 and dries the pre-coating, or the continuous lamination web 50, respectively, on the external side. The pre-coating drying device 61 runs horizontally. Said pre-coating drying device 61 is disposed above the corona pre-treatment device 55 and the pre-coating application device 59.

The corona pre-treatment device 55, the pre-coating application device 59, and the pre-coating drying device 61 form a printing preparation assembly of the lamination web printing assembly 54.

The lamination web printing assembly 54 moreover comprises an ink jet printing device 62 which in terms of the continuous lamination web 50 is disposed downstream of the pre-coating drying device 61. The ink jet printing device 62 is assigned to the continuous lamination web 50 and is capable of imprinting at least one imprint on the continuous lamination web 50, or on the dried pre-coating, respectively, on the external side. The pre-coating is thus located between the at least one imprint and the continuous lamination web 50. The at least one imprint is favourably a colour imprint. Said at least one imprint is located on the printed side of the continuous lamination web 50.

The ink jet printing device 62 comprises a central cylinder 63 which extends perpendicularly to the conveying direction 3 of the continuous lamination web 50, and horizontally. The ink jet printing device 62 furthermore has an ink jet printing bar 64 which has printing heads and which in regions extends about the central cylinder 63 so as to be spaced apart therefrom, while forming a printing gap 65. The continuous lamination web 50, in order to be imprinted on the external side, is guided through the printing gap 65. The ink jet printing device 62 is at least largely disposed in a housing-type heat-protection assembly 66. Said ink jet printing device 62 heats the continuous lamination web 50 when the latter is being imprinted.

The lamination web printing assembly 54 moreover has an infra-red drying device 67 which in terms of the continuous lamination web 50 is disposed downstream of the ink jet printing device 62 and is assigned to the continuous lamination web 50. The infra-red drying device 67 extends horizontally and dries the imprinted continuous lamination web 50, or the at least one imprint of the latter, respectively, by means of infra-red radiation. The infra-red drying device 67 is disposed below the ink jet printing device 62, or the heat-protection assembly 66, respectively, and so as to be adjacent thereto.

A hot air drying device 68 of the lamination web printing assembly 54 in terms of the continuous lamination web 50 is disposed downstream of the infra-red drying device 67, said hot air drying device 68 being assigned to the continuous lamination web 50 and further drying the already somewhat dried imprinted continuous lamination web 50, or the already somewhat dried imprint thereof, respectively, by means of hot air. The hot air drying device 68 extends vertically and so as to be adjacent to the ink jet printing device 62, or to the heat-protection assembly 66, respectively. Said hot air drying device 68 is directly downstream of the infra-red drying device 67.

The lamination web printing assembly 54 favourably has a multiplicity of deflection rollers in order for the continuous lamination web 50 to be guided between the individual components of the lamination web printing assembly 54.

The corrugated cardboard plant, downstream of the hot air drying device 68, has a re-humidification device 69 which is assigned to the continuous lamination web 50 and which from below humidifies said continuous lamination web 50 opposite to the printed side. To this end, a smoothing roller is favourably used. The re-humidification device 69 is disposed downstream of a guide roller 70 which contacts the continuous lamination web 50 and deflects the latter.

The corrugated cardboard plant moreover comprises a guide assembly 71 which extends horizontally below the lamination web splicing device 67 and the lamination web printing assembly 54. The guide assembly 71 has a first guide device 72 for guiding the first corrugated cardboard web 5 laminated on one side, and a second guide device 73 for guiding the second corrugated cardboard web 38 laminated on one side. The first guide device 72 in the guide assembly 71 guides the first corrugated cardboard web 5 laminated on one side above the second corrugated cardboard web 38 laminated on one side and in a manner parallel with the latter. The corrugated cardboard webs 5, 38 laminated on one side are fed to the guide assembly 71 by means of an inclined infeed device 74. The inclined infeed device 74 is disposed between the lamination web splicing device 47 and the second cover web splicing device 39.

The inclined infeed device 74 comprises/forms an alignment assembly having two alignment installations 96, said alignment assembly being disposed between the lamination web splicing device 47 and the second cover web splicing device 39. Each corrugated cardboard web 5, 38 laminated on one side herein is assigned a dedicated alignment installation 96 which is in each case embodied as a swivel frame and comprises an upper roller 97 and a lower roller 98 in order to be wrapped in a Z-shaped manner by the respective corrugated cardboard web 5, 38 laminated on one side. The rollers 97, 98 of the respective alignment installation 96 run so as to be mutually parallel and preferably at different heights. Said rollers 97, 98 are mounted in the respective swivel frame.

The rollers 97, 98 of the respective alignment installation 96 in a non-deflected basic position run horizontally and on top of one another. A lateral deflection of the corrugated cardboard web 5, 38 laminated on one side that is guided therethrough does not occur in this instance.

The swivel frames are in each case pivotable in a mutually independent manner, for example by way of an actuator assembly or a drive, respectively, in order for the corrugated cardboard web 5 and/or 38 laminated on one side to be laterally deflected. Each swivel frame in its entirety is rotatable/pivotable about a rotation point/pivot point, the latter being located between the upper roller 97 and the lower roller 98 of the respective swivel frame. A correction of the position of the respective corrugated cardboard web 5, 38 laminated on one side is thus possible without impinging a side of said web 5, 38 by way of an additional tensile force. The actuator assembly rotates the assigned swivel frame in its entirety in the vertical of said swivel frame. In a deflected or rotated, respectively, position of the swivel frame, the rollers 97, 98 of the latter run so as to be mutually parallel but so as to be oblique in relation to a horizontal or vertical, respectively.

The corrugated cardboard webs 5, 38 laminated on one side are guided upwards again by means of an elevated guide device 75 that is downstream of the lamination web printing assembly 54. The guide assembly 71 in the case of this exemplary embodiment extends horizontally in the floor 56.

A gluing unit 76 of the corrugated cardboard plant is disposed downstream of the re-humidification device 69 and of the elevated guide device 75. The gluing unit 67 is directly downstream of the elevated guide device 75. A horizontal spacing between the lamination web printing assembly 54, or the ink jet printing device 62, respectively, and the gluing unit 76 is extremely minor, in particular smaller than 5 m. In particular, a pre-heating assembly which otherwise is disposed upstream of the gluing unit 76, as is known, in order for the corrugated cardboard webs 5, 38 laminated on one side, and the continuous lamination web 50, to be pre-heated prior to being glued or adhesively bonded, respectively, to one another, is absent. The continuous lamination web 50 is already sufficiently heated by the active ink jet printing device 52.

Figure 4:
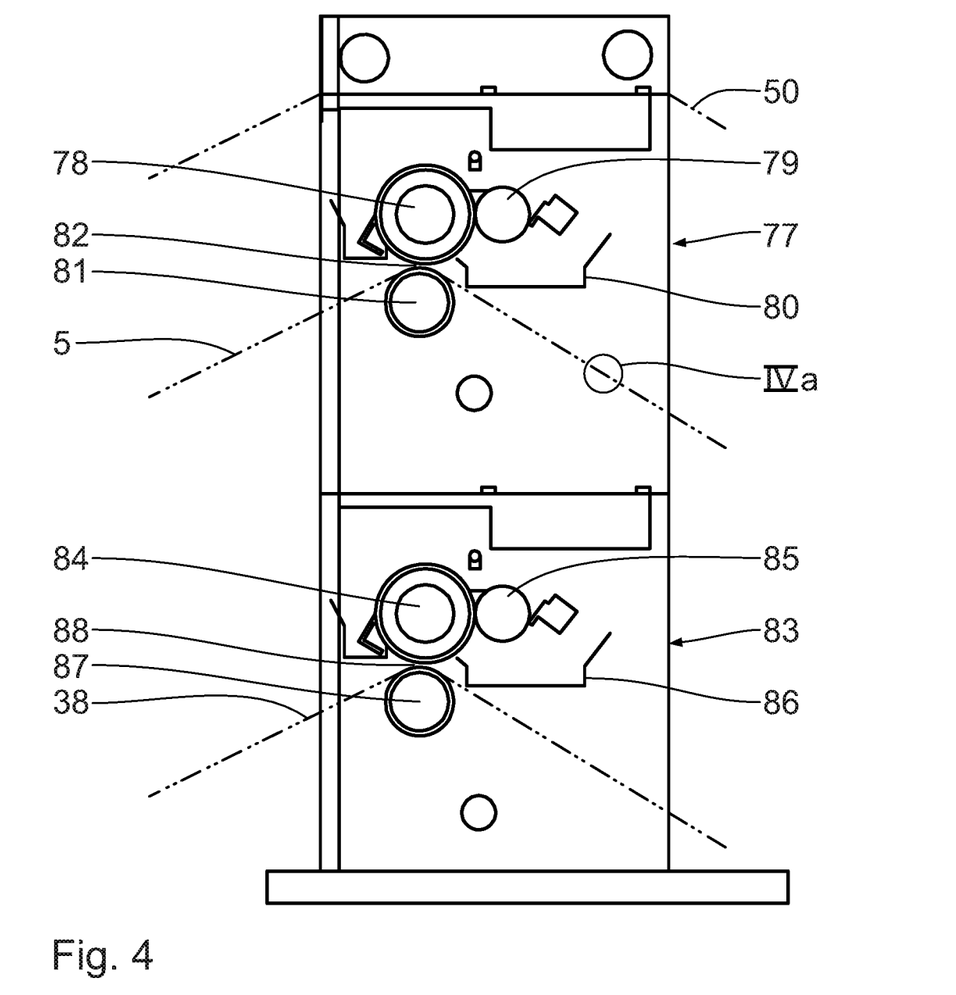
FIG. 4 shows a lateral view of a gluing unit of the corrugated cardboard plant shown in FIGS. 1, 2.
Figure 4A:
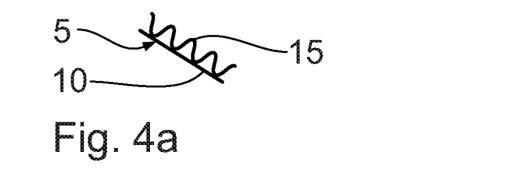
FIG. 4a shows an enlarged fragment which shows the orientation of a corrugated cardboard web laminated on one side in a manner adjacent upstream of the gluing unit.

The gluing unit 76 has a first gluing device 77 having a first gluing roller 78 and a first squeezing roller 79 which bears circumferentially on the first gluing roller 78. The first gluing roller 78 applies glue from a first glue trough 80 of the first gluing device 77 from above to the upward-facing first corrugated web 15 of the first corrugated cardboard web 5 laminated on one side. The first corrugated web 15 therein is thus disposed above the assigned continuous first cover web 10. The first gluing device 77 furthermore has a first contact pressure roller 81 which is disposed below the first gluing roller 78 and the first corrugated cardboard web 5 laminated on one side. The first contact pressure roller 81 conjointly with the first gluing roller 78 configures a first pressure gap/glue gap 82 in which the first corrugated cardboard web 5 laminated on one side by way of the first corrugated web 15 thereof is pressed against the first gluing roller 78. In the gluing unit 76 the first gluing roller 78 and the first squeezing roller 79 as well as the first glue trough 80 are disposed above the first corrugated cardboard web 5 laminated on one side. The first contact pressure roller 81 is disposed below the first corrugated cardboard web 5 laminated on one side. Said first contact pressure roller 81 therein deflects the first corrugated cardboard web 5 laminated on one side.

The gluing unit 76 below the first gluing device 77 has a second gluing device 83 which is configured like the first gluing device 77. The second gluing device 83 comprises a second gluing roller 84 and a second squeezing roller 85 which bears circumferentially on the second gluing roller 84. The second gluing roller 84 applies glue from a second glue trough 86 of the second gluing device 86 from above to the upward-facing second corrugated web of the second corrugated cardboard web 38 laminated on one side. The second corrugated web therein is thus disposed above the assigned continuous second cover web. The second gluing device 83 furthermore has a second contact pressure roller 87 which is disposed below the second gluing roller 84 and the second corrugated cardboard web 38 laminated on one side. The second contact pressure roller 87 conjointly with the second gluing roller 84 configures a second pressure gap/glue gap 88 in which the second corrugated cardboard web 38 laminated on one side by way of the second corrugated web thereof is pressed against the second gluing roller 84. In the gluing unit 76 the second gluing roller 84 and the second squeezing roller 85 as well as the second glue trough 86 are disposed above the second corrugated cardboard web 38 laminated on one side. The second contact pressure roller 87 is disposed below the second corrugated cardboard web 38 laminated on one side. Said second contact pressure roller 87 therein deflects the second corrugated cardboard web laminated on one side.

The continuous lamination web 50 is guided through the gluing unit 76 above the first and the second gluing device 77 or 83, respectively. The continuous lamination web 50 in the gluing unit 76 thus runs above the first corrugated cardboard web 5 laminated on one side and above the second corrugated cardboard web 38 laminated on one side.

The corrugated cardboard plant, downstream of the gluing unit 76, has a compression device 89 which comprises an upper compression belt that is guided over upper guide rollers, and a lower compression belt that is guided over lower guide rollers. An upper belt of the lower compression belt and a lower belt of the upper compression belt run in a horizontal, parallel and mutually adjacent manner. Said upper belt of the lower compression belt and said lower belt of the upper compression belt configure a compression section. The glued corrugated cardboard webs 5, 38 laminated on one side and the continuous lamination web 50 are guided through the compression section. The first corrugated web 15 of the first corrugated cardboard web 5 laminated on one side, and the second corrugated web of the second corrugated cardboard web 38 laminated on one side are in each case directed upwards or disposed in an upwards manner, respectively. Said first corrugated web 15 of the first corrugated cardboard web 5 laminated on one side, and said second corrugated web of the second corrugated cardboard web 38 laminated on one side are in each case disposed above the associated continuous cover web 10 of the respective corrugated cardboard web 5 or 38, respectively, laminated on one side. The continuous lamination web 50 in the pressing gap is disposed above the corrugated cardboard webs 5, 38 laminated on one side. The continuous corrugated cardboard web 1 which is laminated on two sides and has a total of five plies is formed in the compression device 89, while the glue bonds or cures, respectively.

The corrugated cardboard plant, downstream of the compression device 89, has a short transverse cutting device 90 which comprises a knife cylinder and a counter cylinder disposed below the latter. The knife cylinder and the counter cylinder are mounted so as to be rotatable or drivable in a rotating manner, respectively. The short transverse cutting device 90 is capable of generating a cut which extends across the full width of the continuous corrugated cardboard web 1. To this end, the knife cylinder and the counter cylinder are set in rotation in such a manner that said knife cylinder and said counter cylinder interact in the cutting procedure.

The short transverse cutting device 90 is furthermore capable of generating a cut having a specific length and having a specific spacing from a periphery of the continuous corrugated cardboard web 1. To this end, counter-member elements of the counter cylinder are chosen or adjusted in a corresponding manner, respectively. The knife cylinder and the counter cylinder are set in rotation for the cutting procedure in such a manner that a knife of the knife cylinder interacts with the counter-member elements.

The corrugated cardboard plant, downstream of the short transverse cutting device 90, has a longitudinal cutting/grooving device 91 having two grooving units and two longitudinal cutting units disposed downstream of the latter. The longitudinal cutting units are capable of cutting the continuous corrugated cardboard web 1 in the conveying direction 3 while forming corrugated cardboard part-webs. The grooving units are capable of grooving the continuous corrugated cardboard web 1 in order for any later folding to be simplified.

A turnout 92 of the corrugated cardboard plant is provided downstream of the longitudinal cutting/grooving device 91, said turnout 92 being provided for splitting the generated corrugated cardboard part-webs into two different planes.

A transverse cutting device 93 having two partial transverse cutting installations disposed on top of one another is provided downstream of the turnout 92. Each partial transverse cutting installation has two transverse cutting rollers that are drivable in a rotating manner and disposed on top of one another, said transverse cutting rollers extending perpendicularly to the conveying direction 3 and having transverse cutting knives that extend radially outwards in order for the respective corrugated cardboard part-web to be completely severed in a transverse manner, while generating the corrugated cardboard sheets 2.

A conveyor belt on which the corrugated cardboard sheets 2 imprinted on the external side are guided to form a respective stack deposit 95 is disposed downstream of each partial transverse cutting installation.

Figure 5:
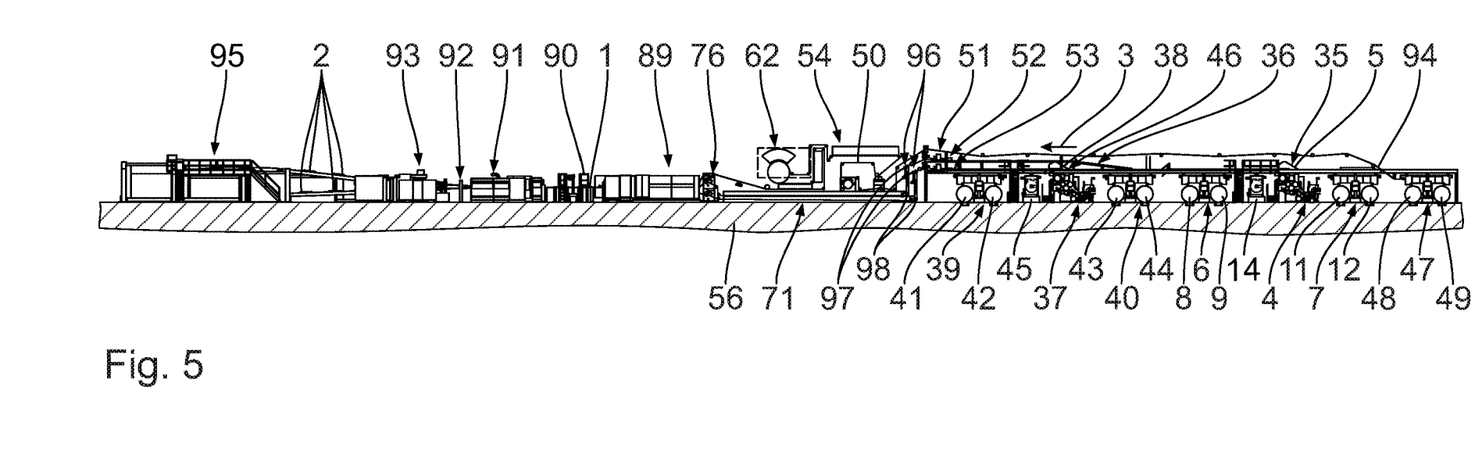
FIG. 5 shows a lateral view of a corrugated cardboard plant of the invention according to a second embodiment.
Figure 6:
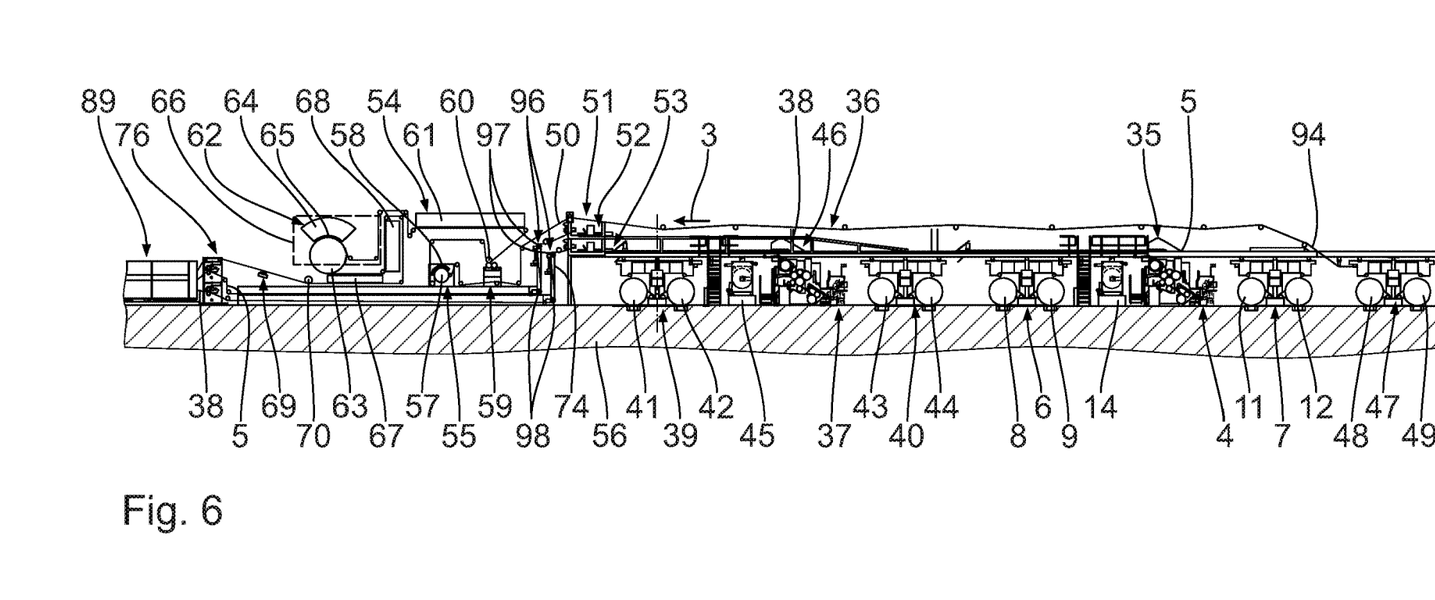
FIG. 6 shows an enlarged fragment from FIG. 5, which shows the device for producing a corrugated cardboard web laminated on two sides and that part of the corrugated cardboard plant that is disposed upstream of said device.
Figure 7:
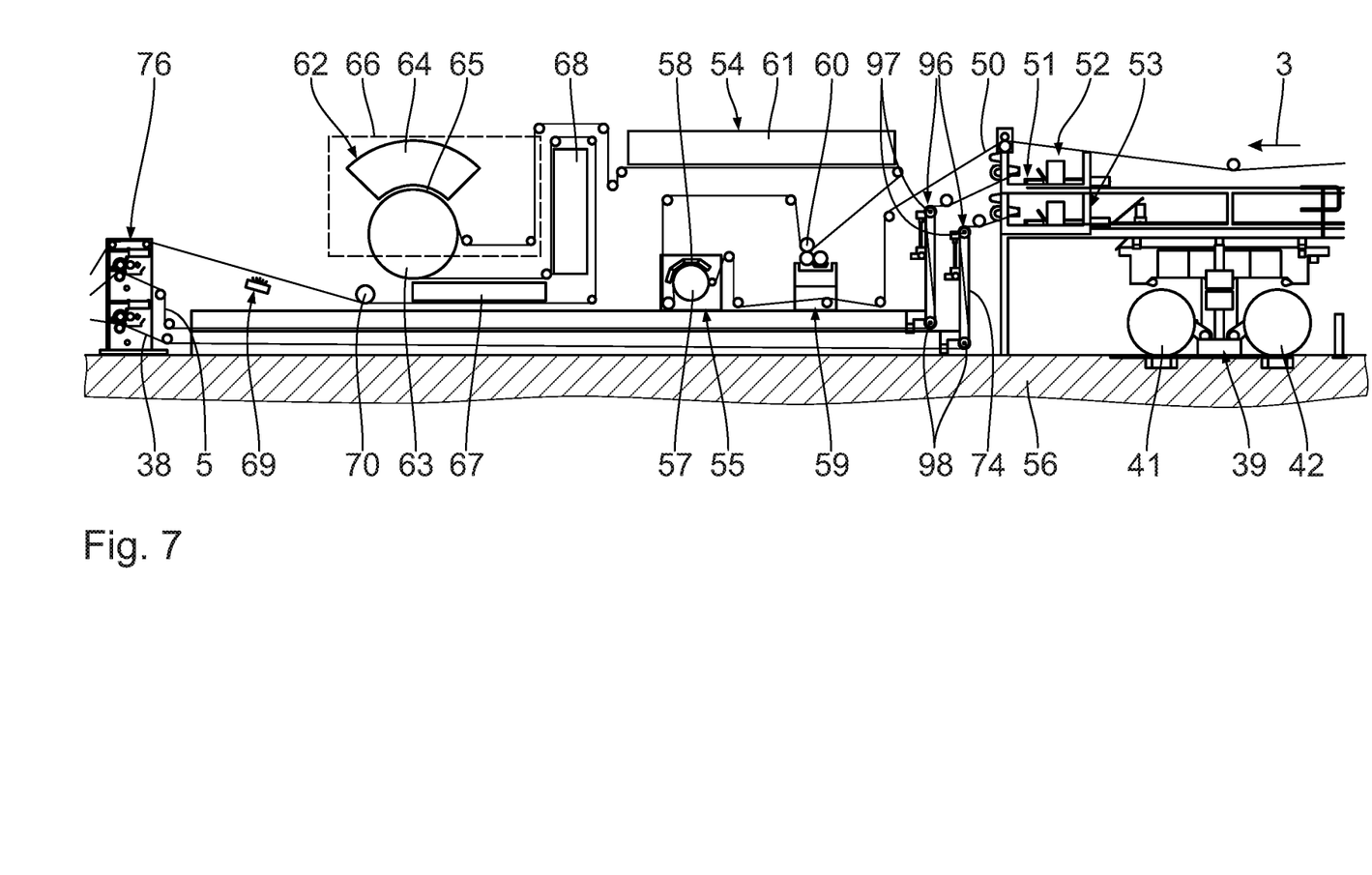
FIG. 7 shows an enlarged fragment from FIG. 5.
Figure 8:
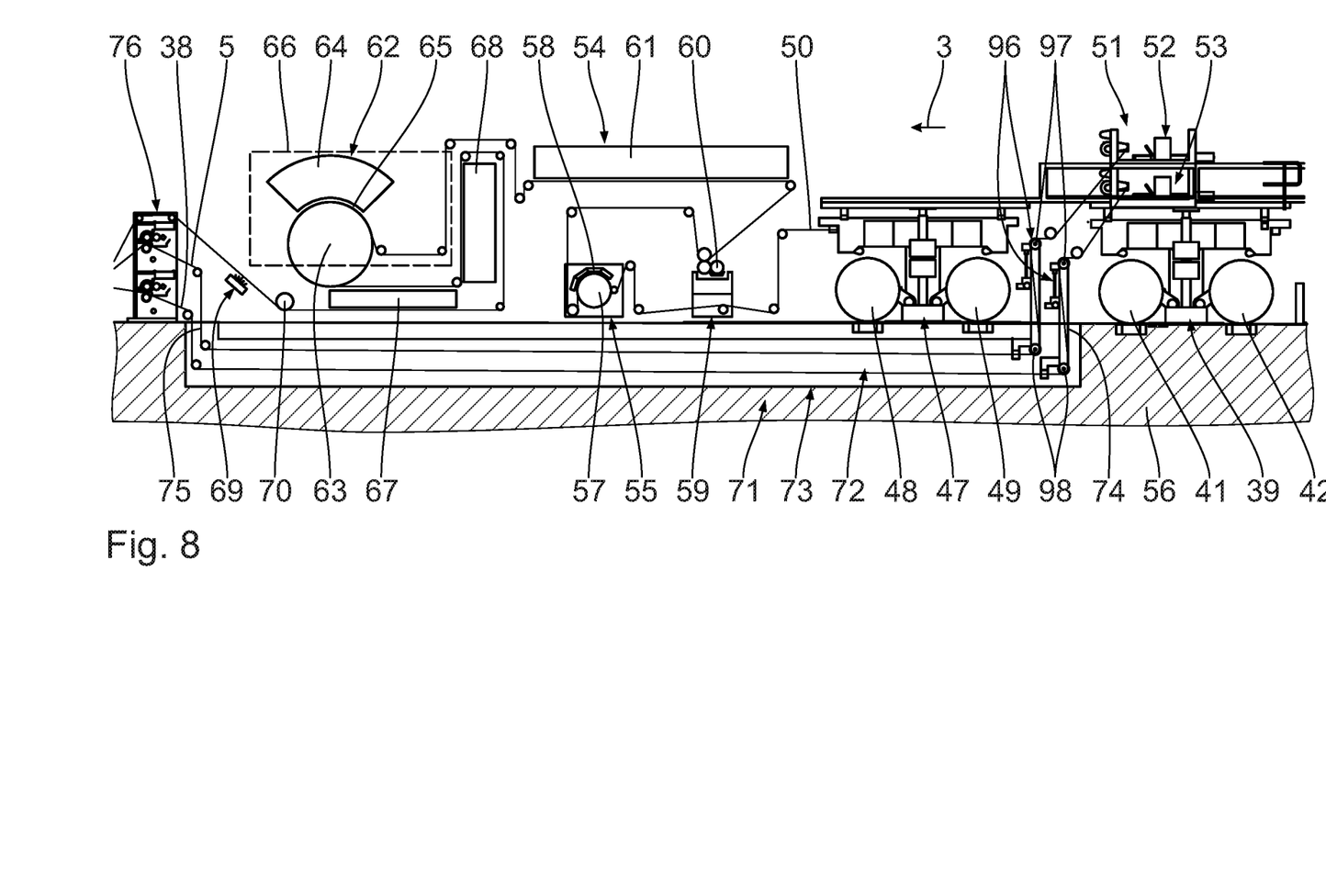
FIG. 8 shows an enlarged fragment from FIG. 1.

A second embodiment will be described hereunder with reference to FIGS. 5, 6. As compared to the first embodiment of the description to which reference herewith is explicitly made, the lamination web splicing device 47 is disposed right at the beginning of the corrugated cardboard plant, so as to be adjacent to the first material web splicing device 7. The continuous lamination web 50 generated by the lamination web splicing device 47 is fed to the gantry 36 by way of a lamination web elevated transportation installation 94. The continuous lamination web 50 on the gantry 36 is guided above the corrugated cardboard webs 5, 38 laminated on one side. Said continuous lamination web 50 therein runs above the first material web splicing device 7, the first device 4 for producing a first corrugated cardboard web 5 laminated on one side, the first cover web splicing device 6, the second material web splicing device 40, the second device 37 for producing a second corrugated cardboard web 38 laminated on one side, and the second cover web splicing device 39, as well as the brake assembly 51. Said continuous lamination web 50 then enters the lamination web printing assembly 54 downstream of the brake assembly 51.

The corrugated cardboard webs 5, 38 laminated on one side are fed to the guide assembly 71 by way of the inclined infeed device 74, the latter being located upstream of the lamination web printing assembly 54 and downstream of the brake assembly 51. The inclined infeed device 74 comprises/forms an alignment assembly having two alignment installations 96 in a manner corresponding to that of the previous embodiment.

The guide assembly 71 is disposed above the floor 56. Said guide assembly 71 extends in a horizontal manner and so as to be adjacent to said floor 56. The continuous lamination web 50 in the gluing unit 76 and the compression device 89 is again located above the corrugated cardboard webs 5, 38 laminated on one side.

According to an alternative embodiment, the corrugated cardboard plant has exactly one device for producing a corrugated cardboard web laminated on one side. A three-ply corrugated cardboard web is thus generated in the corrugated cardboard plant.

What is claimed is:

1. A corrugated cardboard plant for producing corrugated cardboard, comprising:
    a device for producing a corrugated cardboard web laminated on one side from a cover web and a material web;
    a lamination web dispensing device for dispensing a lamination web;
    a lamination web printing assembly, disposed downstream of the lamination web dispensing device, comprising a lamination web printing device for imprinting the lamination web;
    a device, disposed downstream of the lamination web printing assembly, for producing a corrugated cardboard web laminated on two sides from the corrugated cardboard web laminated on one side and the lamination web; and
    a gluing unit which is disposed upstream of the device for producing a corrugated cardboard web laminated on two sides and is configured such that said gluing unit applies glue to the corrugated cardboard web laminated on one side from above the corrugated cardboard web laminated on
one side, wherein:
    the device for producing a corrugated cardboard web laminated on one side is configured such that the corrugated cardboard web laminated on one side, at a location adjacent to and upstream of the device for producing a corrugated cardboard web laminated on both sides, has an upwardly directed corrugation;
    the device for producing a corrugated, cardboard web laminated on one side comprises a corrugating installation for providing a corrugated material web;
    the device for producing a corrugated cardboard web laminated on one side further comprises a glue application installation for applying glue to the corrugated material web to provide a glued corrugated material web, wherein the glue application installation is disposed on a side of the corrugating installation that faces the device for producing a corrugated cardboard web laminated on two sides;
    the device for producing a corrugated cardboard web laminated on one side comprises a pressure installation for pressing the cover web against the glued corrugated material web, the pressure installation having a contact pressure entry;
    the contact pressure entry is disposed so as to be adjacent to the glue application installation;
    the corrugated cardboard web laminated on one side exits the pressure installation by way of a contact pressure exit which faces away from the device for producing a corrugated cardboard web laminated on two sides;
    the lamination web is guided into the device for producing a corrugated cardboard web laminated on two sides such that said lamination web therein runs above the corrugated cardboard web laminated on one side; and the contact pressure entry, of the pressure installation, faces the device for producing a corrugated cardboard web laminated on two sides.

2. The corrugated cardboard plant according to claim 1, further comprising a deflection assembly, disposed downstream of the corrugating installation, for deflecting the corrugated cardboard web laminated on one side in a direction towards the device for producing a corrugated cardboard web laminated on two sides.

3. The corrugated cardboard plant according to claim 1, further comprising glue to be used in the in the gluing unit wherein the glue permits processing temperatures of below 70° C.

4. The corrugated cardboard plant according to claim 1, wherein the gluing unit comprises a gluing roller for gluing the corrugated cardboard web laminated on one side, wherein the gluing roller upwardly delimits a pressure gap for guiding through the corrugated cardboard web laminated on one side.

5. The corrugated cardboard plant according to claim 1, wherein the gluing unit is disposed downstream of the lamination web printing assembly and is disposed adjacent to the lamination web printing assembly.

6. The corrugated cardboard plant according to claim 5, wherein the gluing unit is disposed directly adjacent to the lamination web printing assembly.

7. The corrugated cardboard plant according to claim 5, wherein the gluing unit is disposed such that the lamination web printing assembly heats the lamination web such that the glue applied by the gluing unit bonds.

8. The corrugated cardboard plant according to claim 1, wherein the lamination web printing assembly heats the lamination web such that said lamination web in the device for producing a corrugated cardboard web laminated on two sides is glued to the adjacent corrugated cardboard web laminated on one side.

9. The corrugated cardboard plant according to claim 1, further comprising a guide assembly for guiding the corrugated cardboard web laminated on one side below the lamination web printing assembly.

10. The corrugated cardboard plant according to claim 1, wherein the lamination web printing device comprises a central cylinder and a pressure bar disposed adjacent to the central cylinder, wherein the central cylinder and the pressure bar form a printing gap for guiding the lamination web therethrough.

11. The corrugated cardboard plant according to claim 1, further comprising an alignment assembly, disposed upstream of the device for producing a corrugated cardboard web laminated on two sides, for mutually aligning the laminated corrugated cardboard web and the lamination web.

12. The corrugated cardboard plant according to claim 1, wherein the lamination web dispensing device is disposed adjacent to the lamination web printing assembly.

13. The corrugated cardboard plant according to claim 1, wherein the lamination web dispensing device is disposed in an upstream end region of the corrugated cardboard plant.

14. A corrugated cardboard plant for producing corrugated cardboard, the corrugated cardboard plant comprising:
a device for producing a corrugated cardboard web laminated on one side from a cover web and a material web, the device for producing a corrugated cardboard web laminated on one side comprising: a corrugating installation for providing a corrugated material web from the material web; a glue application installation for applying glue to the corrugated material web to provide a glued corrugated material web; and a pressure installation for pressing the cover web against the glued corrugated material web, the pressure installation having a contact pressure entry and a contact pressure exit through which the corrugated cardboard web laminated on one side exits the pressure installation;
a lamination web dispensing device for dispensing a lamination web;
a lamination web printing assembly comprising a lamination web printing device for imprinting the lamination web, the lamination web printing assembly disposed downstream of the lamination web dispensing device;
a device, disposed downstream of the lamination web printing assembly, for producing a corrugated cardboard web laminated on two sides from the corrugated cardboard web laminated on one side and the lamination web, wherein:
the glue application installation is disposed on a side of the corrugating installation that faces the device for producing a corrugated cardboard web laminated on two sides;
the contact pressure entry is disposed so as to be adjacent to the glue application installation;
the contact pressure entry faces the device for producing a corrugated cardboard web laminated on two sides;
the contact pressure exit which faces away from the device for producing a corrugated cardboard web laminated on two sides;
the device for producing a corrugated cardboard web laminated on one side is configured such that the corrugated cardboard web laminated on one side, at a location adjacent to and upstream of the device for producing a corrugated cardboard web laminated on both sides, has an upwardly directed corrugation;
the lamination web is guided into the device for producing a corrugated cardboard web laminated on two sides such that said lamination web therein runs above the corrugated cardboard web laminated on one side; and
a gluing unit disposed upstream of the device for producing a corrugated cardboard web laminated on two sides and configured such that said gluing unit applies glue to the corrugated cardboard web laminated on one side from above the corrugated cardboard web laminated on one side.

15. The corrugated cardboard plant according to claim 14, further comprising a deflection assembly, disposed downstream of the device for producing a corrugated cardboard web laminated on one side, the deflection assembly being configured to deflect the corrugated cardboard web laminated on one side in a direction towards the device for producing a corrugated cardboard web laminated on two sides from a location adjacent to the contact pressure exit.

16. The corrugated cardboard plant according to claim 14, further comprising a guide assembly for guiding the corrugated cardboard web laminated on one side below the lamination web printing assembly.

17. The corrugated cardboard plant according to claim 14, further comprising an alignment assembly, disposed upstream of the device for producing a corrugated cardboard web laminated on two sides, for mutually aligning the corrugated cardboard web laminated on one side and the lamination web.

\* \* \* \* \*